(12) United States Patent
Son (10) Patent No.: US 9,407,128 B2
(45) Date of Patent: Aug. 2, 2016

(54) APPARATUS FOR ALARMING INVERTER STATUS AND APPARATUS FOR ANALYZING MOTOR STATUS IN MOBILE TERMINAL

(71) Applicant: LSIS CO., LTD., Anyang-si, Gyeonggi-do (KR)

(72) Inventor: Jubeom Son, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 91 days.

(21) Appl. No.: 13/857,041

(22) Filed: Apr. 4, 2013

(65) Prior Publication Data

US 2013/0271052 A1 Oct. 17, 2013

(30) Foreign Application Priority Data

Apr. 12, 2012 (KR) .................... 10-2012-0037806

(51) Int. Cl.
| | | |
|---|---|---|
| *G01R 31/34* | (2006.01) | |
| *H04B 1/40* | (2015.01) | |
| *H02K 11/00* | (2016.01) | |
| *G01M 15/12* | (2006.01) | |
| *H04Q 9/00* | (2006.01) | |

(52) U.S. Cl.
CPC ............ *H02K 11/001* (2013.01); *G01M 15/12* (2013.01); *H02K 11/20* (2016.01); *H04Q 9/00* (2013.01); *H04M 2250/12* (2013.01); *H04Q 2209/50* (2013.01); *H04Q 2209/84* (2013.01)

(58) Field of Classification Search
USPC .............................................. 318/116; 455/73
See application file for complete search history.

(56) References Cited

U.S. PATENT DOCUMENTS

| | | | | |
|---|---|---|---|---|
| 5,852,351 | A | * | 12/1998 | Canada ................ G01R 31/343 318/490 |
| 5,902,342 | A | * | 5/1999 | Mishra ............................ 701/22 |
| 5,992,237 | A | | 11/1999 | McCarty et al. |
| 6,199,018 | B1 | * | 3/2001 | Quist et al. ...................... 702/34 |
| 2002/0132618 | A1 | | 9/2002 | Uchino et al. |
| 2003/0171827 | A1 | * | 9/2003 | Keyes, IV .......... G05B 19/4183 700/19 |

(Continued)

FOREIGN PATENT DOCUMENTS

| | | |
|---|---|---|
| CH | 702943 | 10/2011 |
| DE | 102009022107 | 11/2010 |

(Continued)

OTHER PUBLICATIONS

European Patent Office Application Serial No. 13162529.5, Search Report dated Oct. 15, 2013, 11 pages.

(Continued)

*Primary Examiner* — Eduardo Colon Santana
*Assistant Examiner* — Cortez Cook
(74) *Attorney, Agent, or Firm* — Lee Hong Degerman Kang & Waimey; Jonathan Kang; Jeffrey Lotspeich (57) ABSTRACT

Disclosed are an apparatus for alarming an inverter status and an apparatus for analyzing a motor status in a mobile terminal. The apparatus for analyzing a motor status in a mobile terminal includes: a first recognition unit configured to recognize vibrations of a motor contacting thereto, and providing the vibrations to a controller; a second recognition unit configured to recognize sound of the motor, and providing the sound to the controller; and the controller configured to analyze a frequency from the vibrations and sound of the motor, to check a change of the vibrations, and thus to obtain an analysis result on a status of the motor.

5 Claims, 9 Drawing Sheets

(56) References Cited

U.S. PATENT DOCUMENTS

| | | |
|---|---|---|
| 2007/0202859 A1 | 8/2007 | Ward |
| 2009/0062931 A1* | 3/2009 | Keyes, IV .......... G05B 19/4183 700/7 |
| 2009/0133499 A1* | 5/2009 | Cato ........................ 73/514.16 |
| 2009/0195204 A1* | 8/2009 | Gumpert ..................... 318/460 |
| 2010/0317332 A1* | 12/2010 | Bathiche et al. ............. 455/418 |
| 2011/0032073 A1* | 2/2011 | Mullet ............... G07C 9/00182 340/5.7 |
| 2012/0111114 A1* | 5/2012 | Emde ................. F04D 15/0088 73/579 |

FOREIGN PATENT DOCUMENTS

| | | |
|---|---|---|
| JP | 62-064919 | 3/1987 |
| JP | 2004-279322 | 10/2004 |
| JP | 2006-079311 | 3/2006 |
| JP | 2006-174614 | 6/2006 |
| JP | 2010-094022 | 4/2010 |
| JP | 2011-191181 | 9/2011 |
| WO | 99/60351 | 11/1999 |
| WO | 2006/126200 | 11/2006 |

OTHER PUBLICATIONS

Japan Patent Office Application Serial No. 2013-082336, Office Action dated Apr. 1, 2014, 3 pages.
Real-Time Specialties, "Engine RPM Operations Manual," Jun. 2013, 7 pages.
European Patent Office Application Serial No. 13162529.5, Search Report dated Jul. 18, 2013, 7 pages.
Japan Patent Office Application Serial No. 2013-082336, Office Action dated Sep. 2, 2014, 3 pages.
The State Intellectual Property Office of the People's Republic of China Application Serial No. 201310127810.9, Office Action dated Oct. 8, 2015, 6 pages.

* cited by examiner

APPARATUS FOR ALARMING INVERTER STATUS AND APPARATUS FOR ANALYZING MOTOR STATUS IN MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0037806, filed on Apr. 12, 2012, the contents of which is incorporated by reference herein in its entirety.

BACKGROUND OF THE INVENTION

1. Field of the Invention

The present disclosure relates to an inverter and a motor technique, and particularly, to an apparatus for alarming an inverter status and an apparatus for analyzing a motor status in a mobile terminal.

2. Background of the Invention

In order to drive a motor, the motor should be generally checked and diagnosed for safety. For analysis of a motor status, additional equipment is required. Such equipment checks a motor status by diagnosing a vibration status of the motor. However, the conventional apparatus for analyzing a motor status is very expensive and has a low portability.

If the motor is in a good status, a user drives the motor by connecting an inverter to the motor. In case of driving the motor using the inverter, the motor is stopped when a trip occurs, and a message indicating the occurrence of the trip is displayed on an inverter controlling keypad. A user analyzes the cause of the break down based on the message, and re-operates the inverter to drive the motor.

However, such method has the following problems.

Firstly, in the occurrence of a trip, a user cannot be real time fed-back. As a result, it is difficult to analyze the cause of the trip, and the motor is in a stopped status for a long time. This may cause losses due to stop of equipment to which the inverter is applied.

SUMMARY OF THE INVENTION

Therefore, an aspect of the detailed description is to provide an apparatus for alarming an inverter status and an apparatus for analyzing a motor status capable of informing an inverter status to a user and analyzing a motor status using a mobile terminal.

To achieve these and other advantages and in accordance with the purpose of this specification, as embodied and broadly described herein, there is provided an apparatus for analyzing a motor status in a mobile terminal, the apparatus comprising: a first recognition unit configured to recognize vibrations of a motor contacting thereto, and providing the vibrations to a controller; a second recognition unit configured to recognize sound of the motor, and providing the sound to the controller; and the controller configured to analyze a frequency from the vibrations and sound of the motor, to check a change of the vibrations, and thus to obtain an analysis result on a status of the motor.

According to an embodiment of the present invention, the apparatus may further comprise a display unit configured to display an analysis result on a status of the motor, under control of the controller.

According to an embodiment of the present invention, the apparatus may further comprise a user input unit having a layered structure with the display unit, and configured to receive a user's input.

According to an embodiment of the present invention, the controller may obtain an analysis result on a status of the motor using Fast Fourier Transform (FFT).

According to an embodiment of the present invention, the apparatus may further comprise a storage unit configured to store therein the analysis result on a status of the motor output from the controller.

To achieve these and other advantages and in accordance with the purpose of this specification, as embodied and broadly described herein, there is provided an apparatus for alarming an inverter status in a mobile terminal, the apparatus capable of informing a tripped status of an inverter, and the apparatus comprising: a receiving unit configured to receive a signal (trip signal) indicating that a trip has occurred from the inverter; a display unit configured to perform a display function under control of the controller; a sound output unit configured to output an alarm sound under control of the controller; and the controller configured to control the display unit to display the trip signal in a viewable manner by a user, and to control the sound output unit to output an alarm sound in an audible manner by the user, when the trip signal is received.

According to an embodiment of the present invention, preferably, the controller may control the mobile terminal to vibrate when the trip signal is received.

According to an embodiment of the present invention, preferably, the inverter and the receiving unit may communicate with each other through a wireless network.

According to an embodiment of the present invention, preferably, the trip signal may include information on the inverter.

The present invention may have the following advantages.

Firstly, whether the motor has been broken or not can be determined by analyzing vibrations and sound of the motor using the mobile terminal, a smart device. This can enhance a portable characteristic, and allow a function for analyzing a motor status to be performed with low costs.

Secondly, a trip signal generated when driving the inverter is provided to a user's mobile terminal through wireless communication. This can allow a tripped status of the inverter to be efficiently informed to the user, and can reduce the occurrence of a stopped status of equipment where the inverter is installed. As a result, operation efficiency can be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Hereinafter, a preferred embodiment of the present invention will be explained with reference to the attached drawings.

Figure 1:
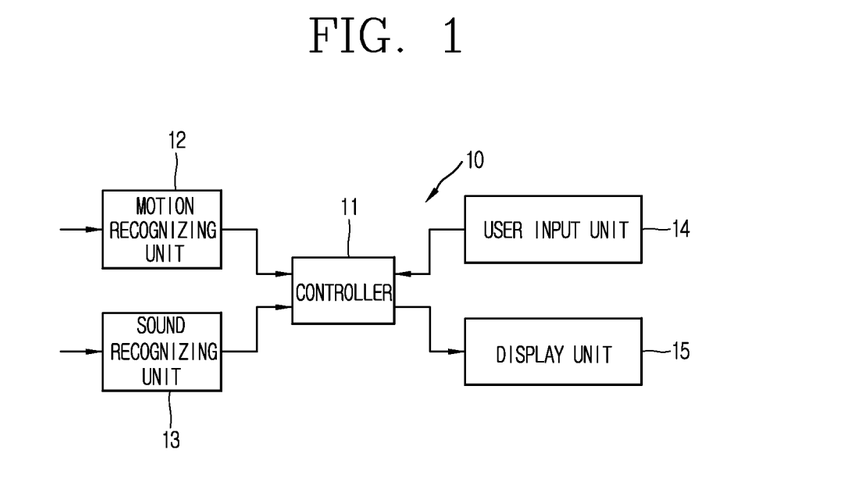
FIG. 1 is a view showing a configuration of an apparatus for analyzing a motor status according to an embodiment of the present invention.

FIG. 1 is a view showing a configuration of an apparatus for analyzing a motor status according to an embodiment of the present invention.

As shown, the apparatus for analyzing a motor status 10 according to an embodiment of the present invention is applied to a mobile terminal 1, and includes a controller 11, a motion recognizing unit 12, a sound recognizing unit 13, a user input unit 14 and a display unit 15.

The mobile terminal 1 to which the present invention is applied, is a smart phone, for instance. The mobile terminal 1 may provide a user with an interface in the form of an application. However, the mobile terminal of the present invention is not limited to a smart phone, but may be applied to a mobile terminal having a similar function (e.g., notebook computer, pad type computer, etc.).

The motion recognizing unit 12 is provided to the mobile terminal, and is implemented as a motion sensor, for instance. However, the motion recognition unit 12 is not limited to the motion sensor. The motion recognizing unit 12 recognizes vibrations of a motor contacting thereto, and provides the vibrations to the controller 11.

The sound recognizing unit 13 recognizes sound of a motor positioned close thereto, and provides the recognized sound to the controller 11.

The controller 11 receives vibrations (frequency) of a motor which has contacted thereto from the motion recognizing unit 12, and receives sound of a motor from the sound recognizing unit 13. Based on the received vibrations of the motor, the controller 11 checks change of the vibrations to thereby determine whether the motor has broken or not, and to acquire an analysis result on a motor status.

The controller 11 may analyze a motor status by converting the vibrations and sound using Fast Fourier Transform (FFT).

The display unit 15 is provided on the front surface of the mobile terminal, and displays an analysis result on a motor status under control of the controller 11 so that a user can view the analysis result. Further, the display unit 15 displays an application for analysis so that a user can view the application.

The user input unit 14 is provided in an layered form with the display unit 15, which is provided on a prescribed position of the display unit 15 in the form of soft keys. A user may perform a key input using the user input unit 14, if he or she wishes to start analyzing a motor status. When the user has performed a key input using the user input unit 14, a signal is transmitted to the controller 11.

FIGS. 2A to 2H are exemplary views for explaining processes for analyzing a motor status by the apparatus for analyzing a motor status according to the present invention.

Figure 2A:
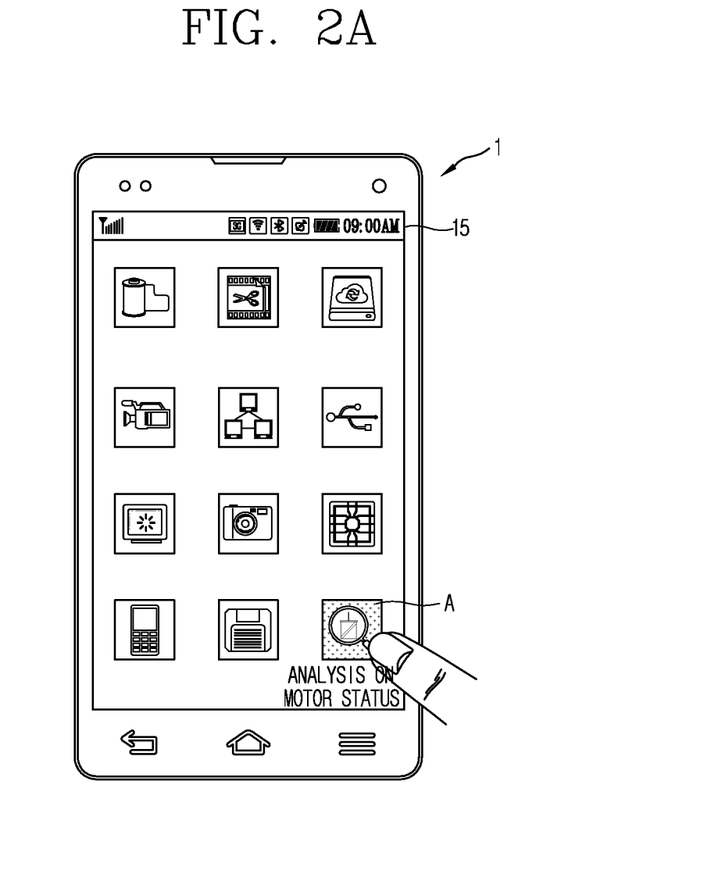
FIGS. 2A to 2H are exemplary views for explaining processes for analyzing a motor status by an apparatus for analyzing a motor status according to the present invention.

As shown, an application (A) for analysis by the apparatus for analyzing a motor status according to the present invention, may be provided to the mobile terminal 1. In a case where a user wishes to perform an analysis on a motor status, the application (A) is selected. In the following descriptions, the mark '✓' indicates a user's selection. The user input unit 14 receives a user's selection, and provides the user's selection to the controller 11 as aforementioned.

Figure 2B:
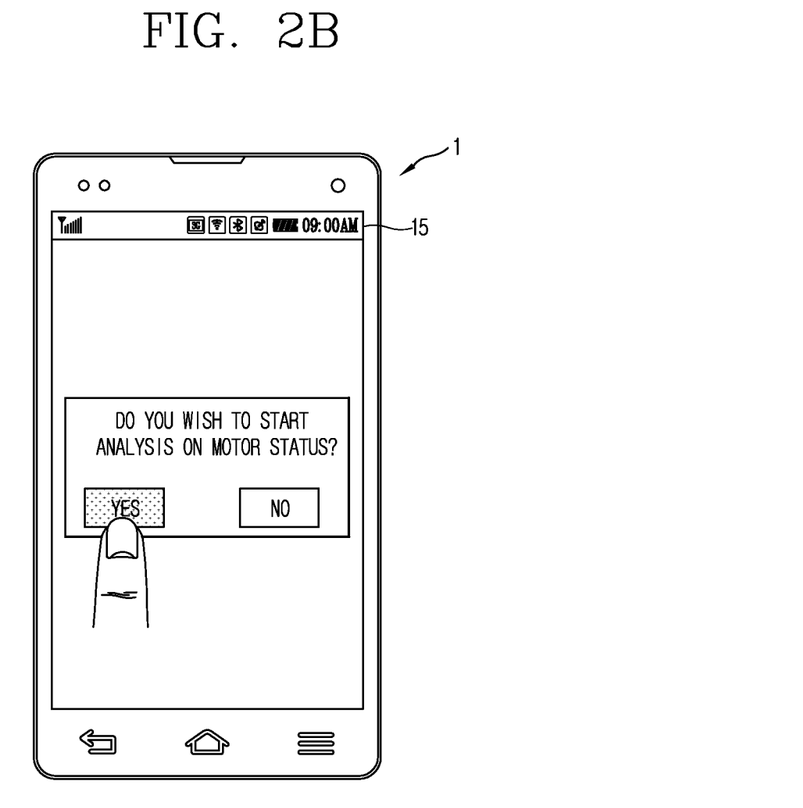
Figure 2C:
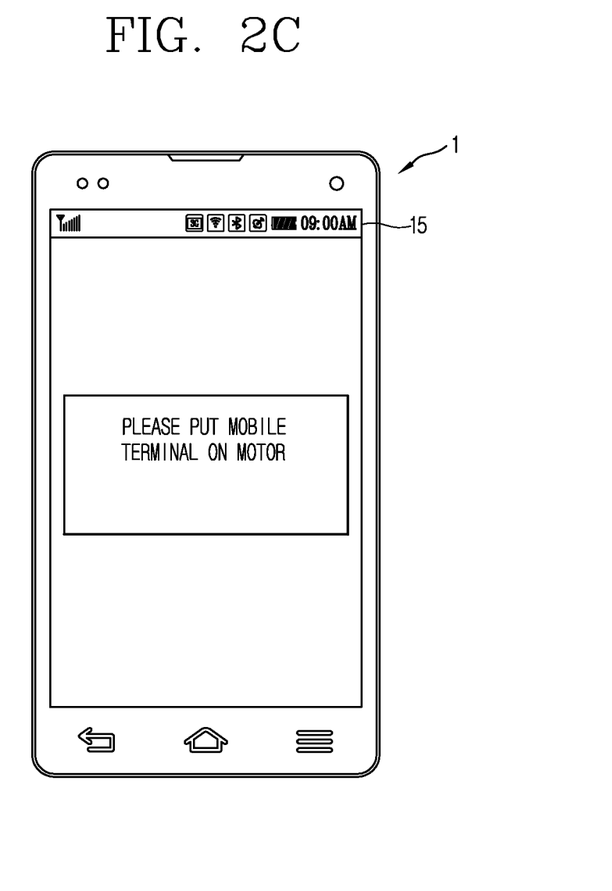
Figure 2D:
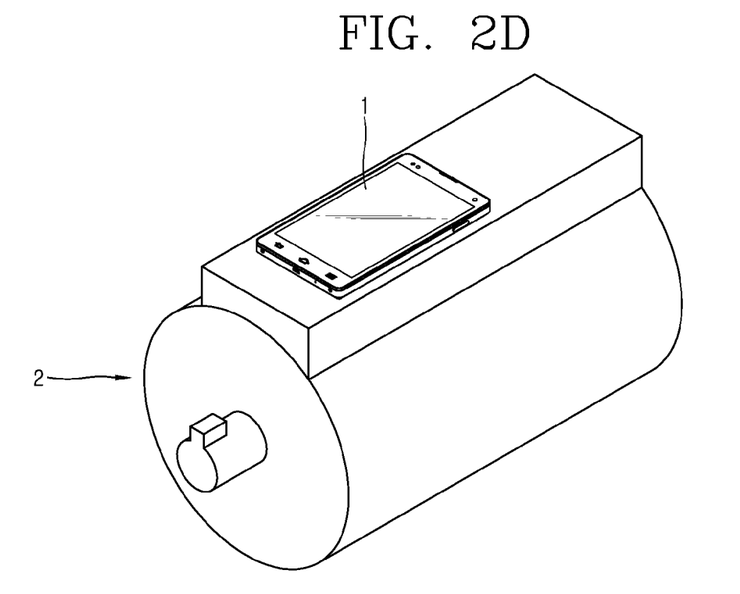
Figure 2E:
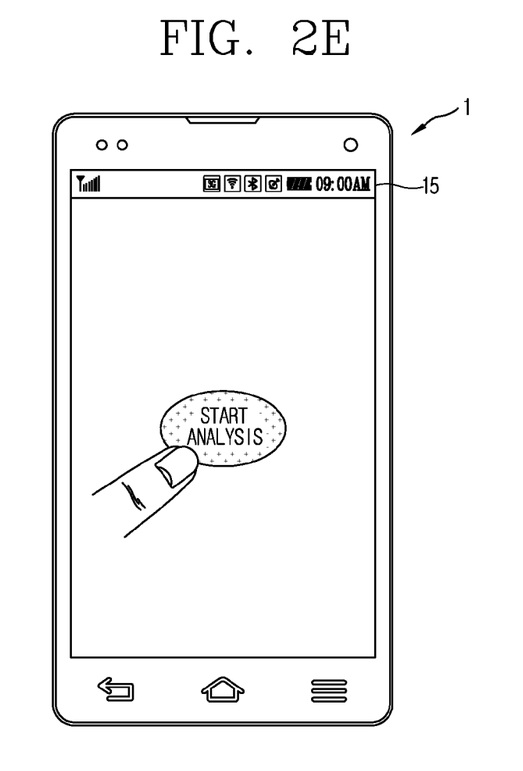

In a case where a user has selected an application for analyzing a motor status, the controller 11 inquires the user whether to start a motor analysis (refer to FIG. 2B). If the user presses a 'YES' button (refer to '✓' of FIG. 2B), the controller 11 controls the display unit 15 to guide contact of the mobile terminal 1 to the motor 2 (refer to FIG. 2C). In FIG. 2C, it is requested that the mobile terminal 1 should be positioned on the motor 2. However, the present invention is not limited to this. Any position can be implemented if vibrations and sound can be obtained as the mobile terminal 1 contacts the motor 2.

Figure 2F:
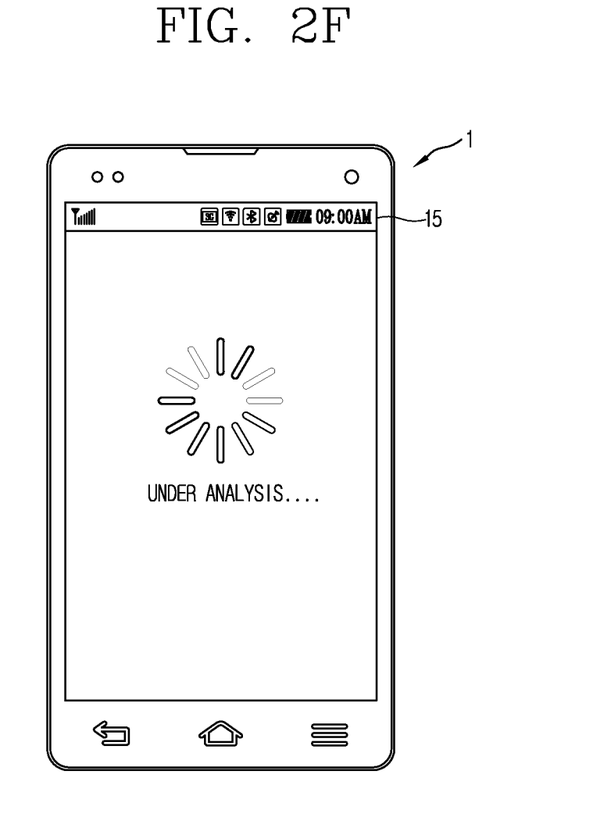

Once the user contacts the mobile terminal 1 to the motor 2 (refer to FIG. 2D) and requests for start of an analysis using the user input unit 14 (refer to FIG. 2E), the controller 11 receives vibrations and sound of the motor 2 from the motor recognizing unit 12 and the sound recognizing unit 13, to thus perform an analysis on the received vibrations and sound (refer to FIG. 2F).

As aforementioned, the controller 11 can analyze a status of the motor 2 by converting the vibrations and sound using FFT. Such method for analyzing a status of the motor 2 using vibrations and sound is well known to those skilled in the art, and thus its detailed explanations will be omitted.

Figure 2G:
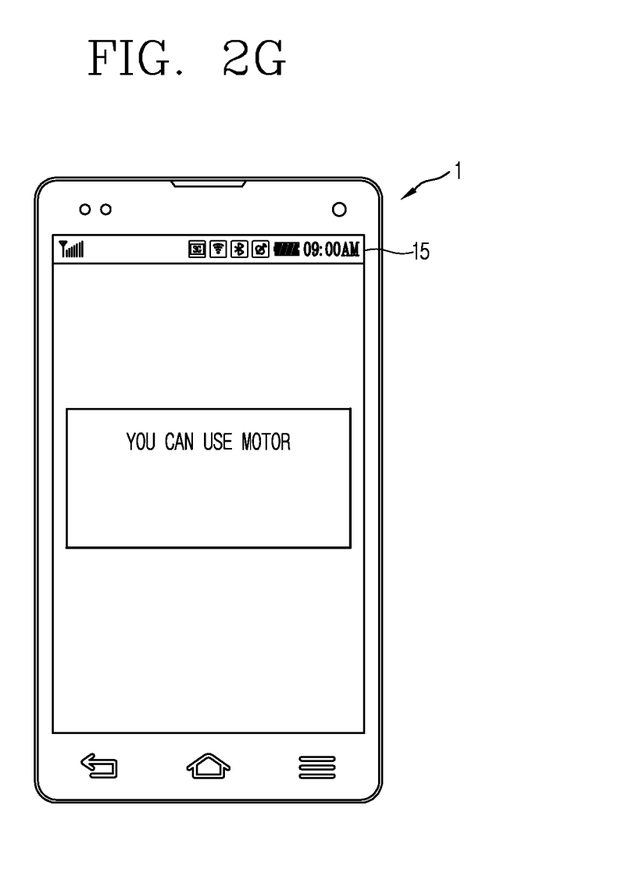
Figure 2H:
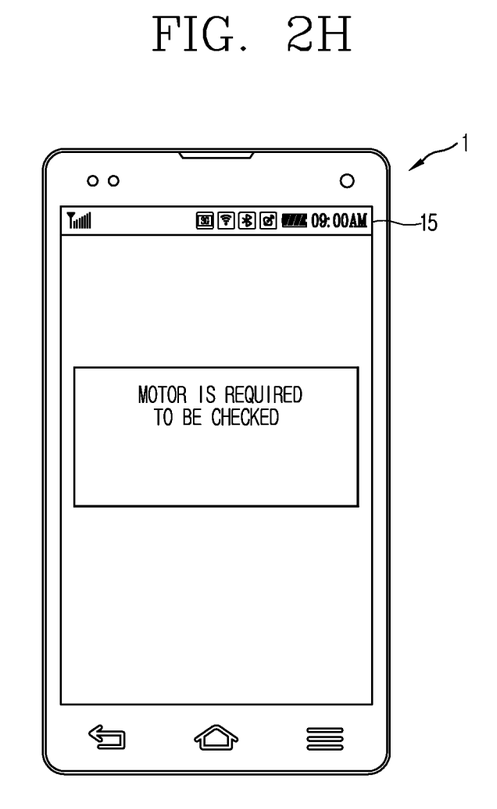

If the motor 2 is in a normal status as an analysis result by the controller 11, the controller 11 may control the display unit 15 to display a message indicating that a user can use the motor 2 (refer to FIG. 2G). On the other hand, if the motor 2 is in an abnormal status as an analysis result by the controller 11, the controller 11 may control the display unit 15 to display a message indicating that the motor 2 should be checked (refer to FIG. 2H). FIG. 2H merely illustrates that the motor 2 is required to be checked. However, it is also possible to guide a specific part of the motor 2 to be checked, according to vibrations of the motor 2.

The controller 11 may store an analysis result relating to the analyzed motor status. For this, the mobile terminal 1 may further include a storage unit.

The apparatus for analyzing a motor status according to the present invention may easily analyze a motor status, using the motion recognizing unit (e.g., motion sensor) and the sound recognizing unit of the mobile terminal 1.

In case of driving the analyzed motor, the occurrence of a trip on the inverter may be informed in the form of an application of the mobile terminal 1, which will be explained in more detail.

Figure 3:
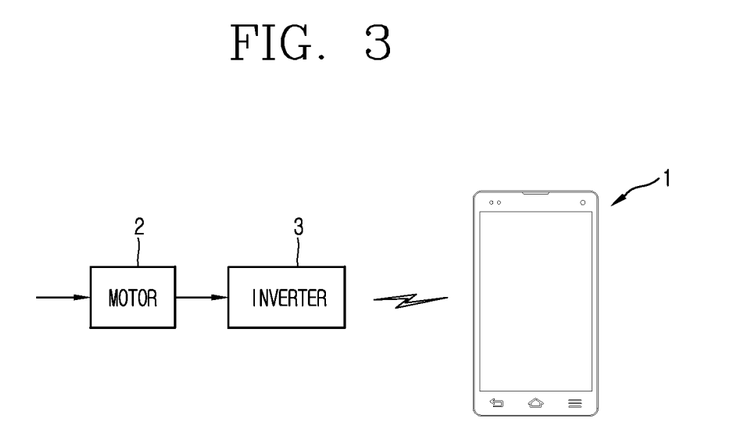
FIG. 3 is an exemplary view for explaining a system to which an apparatus for alarming an inverter status according to the present invention is applied.
Figure 4:
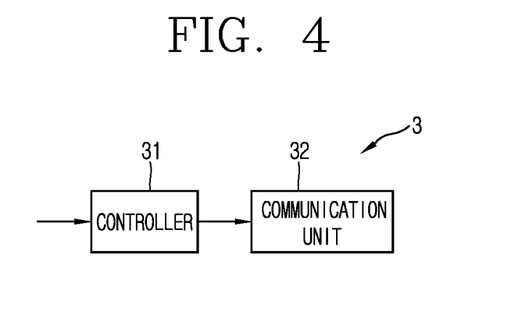
FIG. 4 is a detailed view showing a configuration of an inverter of FIG. 3 according to an embodiment of the present invention.
Figure 5:
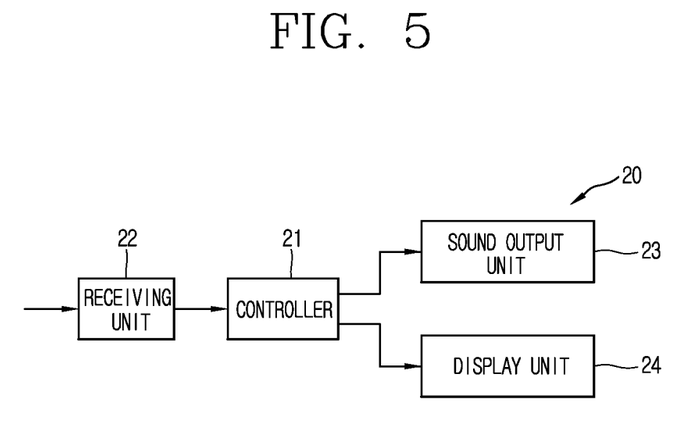
FIG. 5 is a view showing a configuration of an apparatus for alarming an inverter status according to an embodiment of the present invention.

FIG. 3 is an exemplary view for explaining a system to which an apparatus for alarming an inverter status according to the present invention is applied, FIG. 4 is a detailed view showing a configuration of an inverter of FIG. 3 according to an embodiment of the present invention, and FIG. 5 is a view showing a configuration of an apparatus for alarming an inverter status according to an embodiment of the present invention.

As shown in FIG. 3, the present invention is applied to a system which interworks between an inverter 3 for driving the motor 2 and the mobile terminal 1. For this, the inverter 3 includes a controller 31 and a communication unit 32. It is obvious to those skilled in the art that the inverter 3 includes a plurality of components. However, components irrelevant to the present invention will not be explained.

In a case where a trip has occurred from the inverter 3, the controller 31 generates a trip signal, and the communication unit 32 transmits the generated trip signal to the mobile terminal 1 through a radio network.

The inverter 3 and the mobile terminal 1 of the present invention perform wireless communication, e.g., WiFi, $3^{rd}$ generation (3G) mobile communication or $4^{th}$ generation (4G) mobile communication. However, the present invention is not limited to this.

As shown in FIG. 5, the apparatus for alarming an inverter status according to the present invention is provided to the mobile terminal 1, and includes a controller 21, a receiving unit 22, a sound output unit 23 and a display unit 24.

The receiving unit 22 receives a trip signal transmitted from the communication unit 32 of the inverter 3. The controller 21 may control the display unit 24 to display the trip signal received by the receiving unit 22, in a viewable manner by a user. Alternatively, the controller 21 may control the sound output unit 23 to output the trip signal received by the receiving unit 22, in the form of an alarm sound. Although not shown, the controller 21 may control the mobile terminal 1 to vibrate, while the display unit 24 displays an alarm sound with respect to the trip signal.

Preferably, the trip signal received by the receiving unit 22 includes information on the inverter 3 which has transmitted the trip signal.

Figure 6:
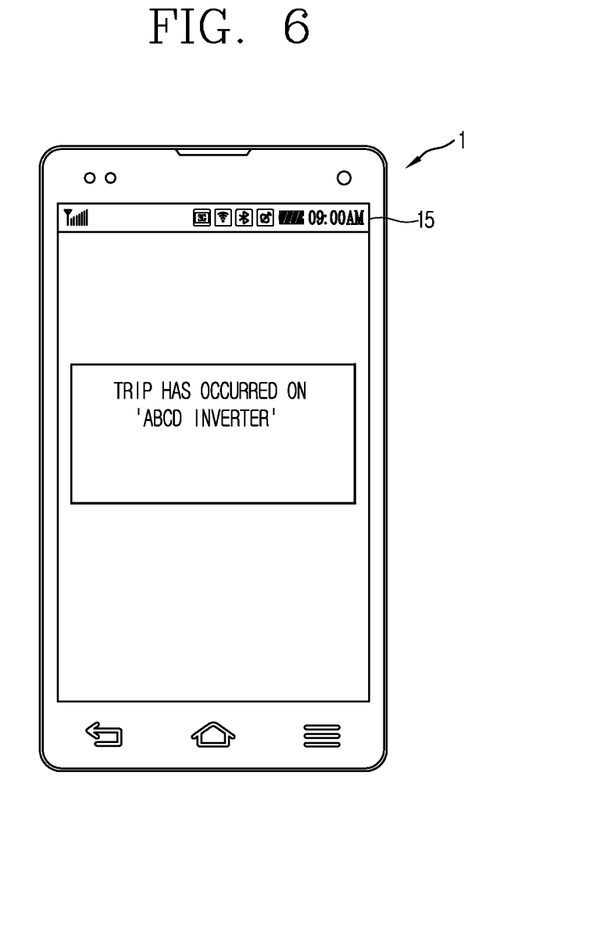
FIG. 6 is an exemplary view for explaining an alarm message displayed on a display unit according to the present invention.

FIG. 6 is an exemplary view for explaining an alarm message displayed on the display unit according to the present invention.

The controller 21 may control display of the occurrence of a trip from a prescribed inverter ('ABCD inverter' in FIG. 6). However, this is merely exemplary. The controller 21 of the present invention may control display of the occurrence of a trip in other forms.

The present invention can have the following advantages.

Firstly, whether the motor has been broken or not can be determined by analyzing vibrations and sound of the motor using a smart device. This can enhance a portable characteristic, and allow a function for analyzing a motor status to be performed with low costs.

Secondly, a trip signal generated when driving the inverter is provided to a user's mobile terminal through wireless communication. This can allow a tripped status of the inverter to be efficiently informed to the user, and can reduce the occurrence of a stopped status of equipment where the inverter is installed. As a result, operation efficiency can be enhanced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a first recognition unit configured to recognize vibrations of an electrical motor contacting thereto, and providing the vibrations to a controller;
a second recognition unit configured to recognize sound of the electrical motor, and providing the sound to the controller; and
the controller configured to analyze a frequency from the vibrations and sound of the electrical motor, to check a change of the vibrations, and thus to obtain an analysis result on a status of the electrical motor,
wherein the mobile terminal is positioned on a surface of a body of the electrical motor such that the first recognition unit detects the vibrations transmitted through the surface; and
wherein the controller is further configured to determine whether the analysis result on the status of the electrical motor is normal or abnormal by analyzing both the vibrations of the electrical motor recognized by the first recognition unit and the sound of the electrical motor recognized by the second recognition unit, and
wherein the first recognition unit is located within a body of the mobile terminal, and the electrical motor and the mobile terminal are physically distinct devices.

2. The mobile terminal of claim 1, further comprising a display unit configured to display the analysis result on the status of the electrical motor, under control of the controller.

3. The mobile terminal of claim 1, further comprising a user input unit having a layered structure with the display unit, and configured to receive a user's input.

4. The mobile terminal of claim 1, wherein the controller obtains the analysis result on the status of the electrical motor using Fast Fourier Transform (FFT).

5. The mobile terminal of claim 1, further comprising a storage unit configured to store therein the analysis result on the status of the electrical motor output from the controller.

\* \* \* \* \*